US010452697B2

(12) United States Patent
Xiang

(10) Patent No.: US 10,452,697 B2
(45) Date of Patent: Oct. 22, 2019

(54) METHOD AND SYSTEM OF SEARCHING A PUBLIC ACCOUNT IN A SOCIAL NETWORKING APPLICATION

(71) Applicant: TenCent Technology (Shenzhen) Company Limited, Shenzhen (CN)

(72) Inventor: Guoyi Xiang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 510 days.

(21) Appl. No.: 15/197,206

(22) Filed: Jun. 29, 2016

(65) Prior Publication Data

US 2016/0314199 A1 Oct. 27, 2016

Related U.S. Application Data

(63) Continuation of application No. PCT/CN2015/070264, filed on Jan. 7, 2015.

(30) Foreign Application Priority Data

Apr. 28, 2014 (CN) .......................... 2014 1 0175962

(51) Int. Cl.
*G06F 16/335* (2019.01)
*G06F 16/9535* (2019.01)
(Continued)

(52) U.S. Cl.
CPC ........ *G06F 16/335* (2019.01); *G06F 16/9535* (2019.01); *G06Q 30/02* (2013.01); *G06Q 50/01* (2013.01)

(58) Field of Classification Search
CPC ......... G06F 17/30699; G06F 17/30867; G06F 16/335; G06F 16/9535
(Continued)

(56) References Cited

U.S. PATENT DOCUMENTS

2012/0023085 A1* 1/2012 Bellerive .......... G06F 17/30867
707/706
2013/0282706 A1* 10/2013 Yoo .................. G06F 17/30867
707/723
(Continued)

FOREIGN PATENT DOCUMENTS

CN 102884816 A 1/2013
CN 102902681 A 1/2013
(Continued)

OTHER PUBLICATIONS

International Search Report for PCT/CN2015/070264 dated Mar. 30, 2015 (3 pgs).
(Continued)

*Primary Examiner* — Joshua Bullock
(74) *Attorney, Agent, or Firm* — Morgan, Lewis & Bockius LLP

(57) ABSTRACT

A method of searching a public account in a social networking application includes logging in to a social networking application using a user account and then searching a public account using a keyword in an account database of the social networking application. The method further includes acquiring a first list of public accounts that match the keyword; acquiring a second list of public accounts that friends of the user liked; and comparing the first list of public accounts with the second list of public accounts. If a public account of the first list also appears on the second list, the method includes retrieving information of friends who liked the public account, counting a number of friends who liked the public account, and displaying the public accounts in the first list with information of friends who liked the public accounts.

12 Claims, 4 Drawing Sheets

(51) Int. Cl.
    *G06Q 50/00*      (2012.01)
    *G06Q 30/02*      (2012.01)
(58) Field of Classification Search
    USPC .......................................................... 707/733
    See application file for complete search history.

(56) References Cited

U.S. PATENT DOCUMENTS

| | | | |
|---|---|---|---|
| 2014/0067967 A1* | 3/2014 | Jackson | G06Q 50/01 |
| | | | 709/206 |
| 2014/0236929 A1 | 3/2014 | Xie | |
| 2014/0164401 A1* | 6/2014 | Kyaw | G06F 17/30867 |
| | | | 707/751 |
| 2015/0193540 A1* | 7/2015 | Wexler | G06F 17/30867 |
| | | | 707/734 |

FOREIGN PATENT DOCUMENTS

| | | |
|---|---|---|
| CN | 103177106 A | 6/2013 |
| CN | 103347046 A | 10/2013 |
| CN | 103365845 A | 10/2013 |
| CN | 103455615 A | 12/2013 |
| CN | 103841190 A | 6/2014 |

OTHER PUBLICATIONS

Office Action dated Feb. 4, 2017 for Chinese Application No. 201410442430.9, 9 pages.
Office Action dated Oct. 8, 2015 for Chinese Application No. 201410175962.0, 7 pages.

* cited by examiner

METHOD AND SYSTEM OF SEARCHING A PUBLIC ACCOUNT IN A SOCIAL NETWORKING APPLICATION

RELATED APPLICATION

This application is a continuation of International Application No. PCT/CN2015/070264, filed on Jan. 7, 2015, which claims priority to Chinese Patent Application No. 201410175962.0, entitled "Method and System of Searching a Public Account in a Social Networking Application" filed on Apr. 28, 2014, both of which are incorporated by reference in their entirety.

TECHNICAL FIELD

The present application relates to the field of mobile interact and social networking, and in particular, to a method and a system of searching a public account in a social networking application.

BACKGROUND

Social networking applications have become an essential element of the current networking life. Using a social networking application, a person can easily and instantly reach his or her contacts. The present technologies provide a variety of platforms for social networking applications. When public accounts are implemented in the social networking applications, the platforms of the social networking applications are transformed from pure instant messaging platforms to business trading platforms. A public account may be applied by a company or an individual user, and associated with accounts in other social networking tools. Through the public account, a user can share texts, photos, audios, and videos with a certain group of people, and interact with the certain group of people in full range. In general, a public account of a social networking application may include a service account of a public platform, and a subscription account of the public platform. The service account of a public platform may provide services to user such as banking, air traveling, train traveling, etc. The subscription account of the public platform may provide news and information to users such as daily news, health information, shopping information, etc. The most favorite functions of a public account include news publishing, brand marketing, media propagation, and user interaction, etc. The government departments, private companies, media companies, or individual users now open the public accounts to publish information and provide service; and more and more social networking users choose to "like" the public accounts such that they receive instant updates on the news/information published by the public accounts, and facilitate daily life by using the services provided.

A social networking application user may like a public account in, for example, two ways: (1) via scanning the two-dimensional code of the public account; and (2) via searching a keyword of the public account. Scanning the two-dimensional code of the public account may be limited by the popularity of the public account. Further, with the increasing numbers of public accounts, searching the keyword may return an increasingly long list of public accounts. A user cannot quickly recognize and select the public accounts he/she is interested in, and instead, has to go through the list of public accounts that match the keyword. Therefore, the procedure of searching and adding an interested public account is time-consuming.

SUMMARY

In accordance with some implementations of the present application, a method of searching a public account in a social networking application is performed at a computer having one or more processors and memory storing programs executed by the one or more processors. The method includes logging in a social networking application using a user account; searching a public account using a keyword in an account database of the social networking application; acquiring a first list of public accounts that match the keyword; acquiring a second list of public accounts that friends of the user liked; comparing the first list of public accounts with the second list of public accounts; and if a public account of the first list also appears on the second list, retrieving information of friends who liked the public account; counting a number of friends who liked the public account; and displaying the public accounts in the first list with information of friends who liked the public accounts.

In some embodiments, the method of searching a public account in a social networking application further includes displaying a brief profile of each public account in the first list with information of friends who liked the public account, wherein information of friends include icons of the friends, names of the friends, and/or signatures of the friends.

In some embodiments, the public accounts in the first list are displayed according to the number of friends who liked the public accounts in a descending order.

In some embodiments, the method of searching a public account in a social networking application further includes acquiring a degree of activity for each public account in the first list, and displaying the public accounts in the first list according to the degrees of activity in a descending order.

In some embodiments, the method of searching a public account in a social networking application further includes if two public accounts have a same degree of activity, displaying a public account with certification prior to a public account with no certification; and if two public accounts have the same degree of activity and certifications respectively, displaying the two public accounts according to the number of friends who liked the two public accounts in a descending order.

In accordance with some implementations of the present application, a system of searching a public account in a social networking application, includes one or more processors; memory; and one or more programs stored in the memory and configured for execution by the one or more processors, the one or more programs including instructions for: logging in a social networking application using a user account; searching a public account using a keyword in an account database of the social networking application; acquiring a first list of public accounts that match the keyword; acquiring a second list of public accounts that friends of the user liked; comparing the first list of public accounts with the second list of public accounts; if a public account of the first list also appears on the second list, retrieving information of friends who liked the public account; counting a number of friends who liked the public account; and displaying the public accounts in the first list with information of friends who liked the public accounts.

In accordance with some implementations of the present application, a non-transitory computer readable storage medium, stores one or more programs for execution by one or more processors of a service processing system including instructions for: logging in a social networking application using a user account; searching a public account using a keyword in an account database of the social networking application; acquiring a first list of public accounts that match the keyword; acquiring a second list of public accounts that friends of the user liked; comparing the first list of public accounts with the second list of public accounts; if a public account of the first list also appears on the second list, retrieving information of friends who liked the public account; counting a number of friends who liked the public account; and displaying the public accounts in the first list with information of friends who liked the public accounts.

BRIEF DESCRIPTION OF DRAWINGS

The aforementioned implementation of the present application as well as additional implementations will be more clearly understood as a result of the following detailed description of the various aspects of the present application when taken in conjunction with the drawings. Like reference numerals refer to corresponding parts throughout the several views of the drawings.

To illustrate the technical solutions in the embodiments of the present application more clearly, accompanying drawings required for describing the embodiments or the prior art are briefly introduced in the following. As is apparent, the accompanying drawings in the following description are merely some embodiments of the present application, and persons of ordinary skills in the art may further obtain other drawings according to these accompanying drawings without creative efforts.

DETAILED DESCRIPTION

The technical solutions in the embodiments of the present application are described in the following with reference to the accompanying drawings. As will be evident, the embodiments to be described are merely part of rather than all of the embodiments of the present application. All other embodiments obtained by persons of ordinary skill in the art based on the embodiments of the present application without creative efforts shall fall within the protection scope of the present application.

While particular embodiments are described above, it will be understood that it is not intended to limit the present application to these particular embodiments. On the contrary, the present application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 1:
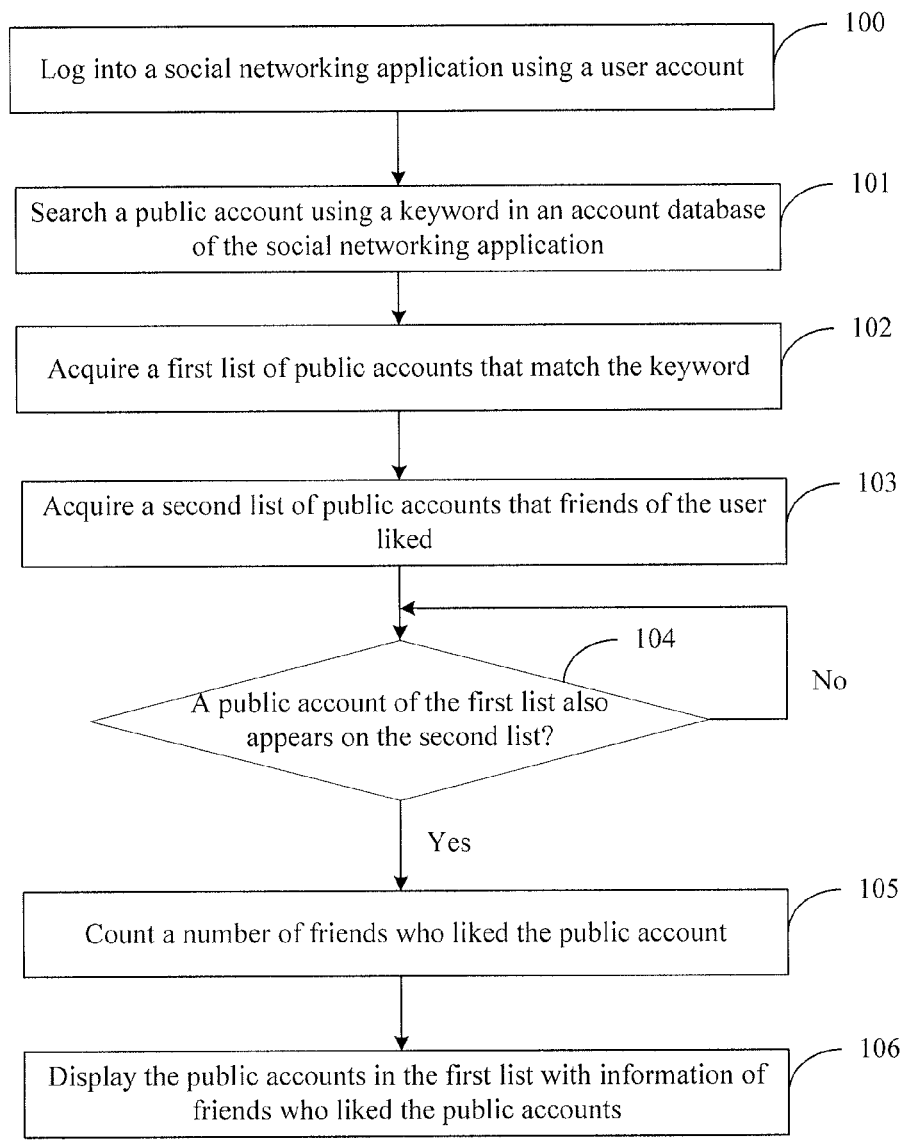
FIG. 1 is an exemplary method of searching a public account in a social networking application according to some embodiments of the present application.

FIG. 1 is an exemplary method of searching a public account in a social networking application according to some embodiments of the present application. As shown in FIG. 1, a method of searching a public account in a social networking application may include steps discussed below.

At step 100, a user logs in a social networking application using a user account.

At step 101, the user searches a public account using a keyword in an account database of the social networking application.

At step 102, a first list of public accounts that match the keyword is acquired.

At step 103, a second list of public accounts that friends of the user liked is acquired.

At step 104, the first list of public accounts is compared with the second list of public accounts, and a determination is made as if a public account of the first list also appears on the second list.

At step 105, if a public account of the first list also appears on the second list, information of friends who liked the public account is retrieved, and a number of friends who liked the public account is counted and recorded.

At step 106, the public accounts in the first list are displayed with information of friends who liked the public accounts.

In some embodiments, information related to a public account may be retrieved from the data associated with registered public accounts, and may include an icon or a photo of the public account, a name of the public account, a brief description of the public account, the usage of the public account, the certification information, the owner's information, etc. Such information may facilitate the user to know the service provided by the public account, type of information published by the public account, and the like.

In some embodiments, the public accounts in the first list may be displayed according to the number of friends who liked the public accounts in a descending order.

In general, number of friends that liked or followed a public account may indicate the popularity and influence of the public account. More friends liking or following a public account may indicate the account is more popular or has more influence. Thus, a public account with a high number of liked or followed friends may be more interesting to a user. Displaying the searched public accounts according to the number of friends who liked the public accounts in a descending order may facilitate the user's selection of an interested public account, and eliminate the time and procedure of the user's selection of an interested public account.

In some embodiments, a brief profile of each public account in the first list may be displayed with information of friends who liked the public account, where information of friends may include icons of the friends, names of the friends, and signatures of the friends.

In some embodiments, information of the public account being displayed may include a name and an icon or a photo of the public account, certification status, certification unit, owner information, number of friends who liked or followed the public account, usage and function of the public account, history publications, and the like.

In some embodiments, the names of the public account in the first list and the second list may be compared to each other. If the names of the public account in the first list and the second list are the same, the certification units or the owners' names may be compared to further determine whether the two public accounts in the first and second list, respectively, are the same. If the certification units or the owners' names of the two public accounts in the first and second list, respectively, are the same, a decision may be made that the public account of the first list also appears on the second list.

According to the present application, a list of public accounts may be displayed with numbers of friends who liked or followed the public accounts. Therefore, the user may learn the popularity and influence of each searched public account among his/her friends at a glance, and may quickly determine which public accounts to like. Accordingly, the present application may provide an efficient method to search a public account in a social networking application, and eliminate the time and procedure to find an interesting public account to like or follow.

Figure 2:
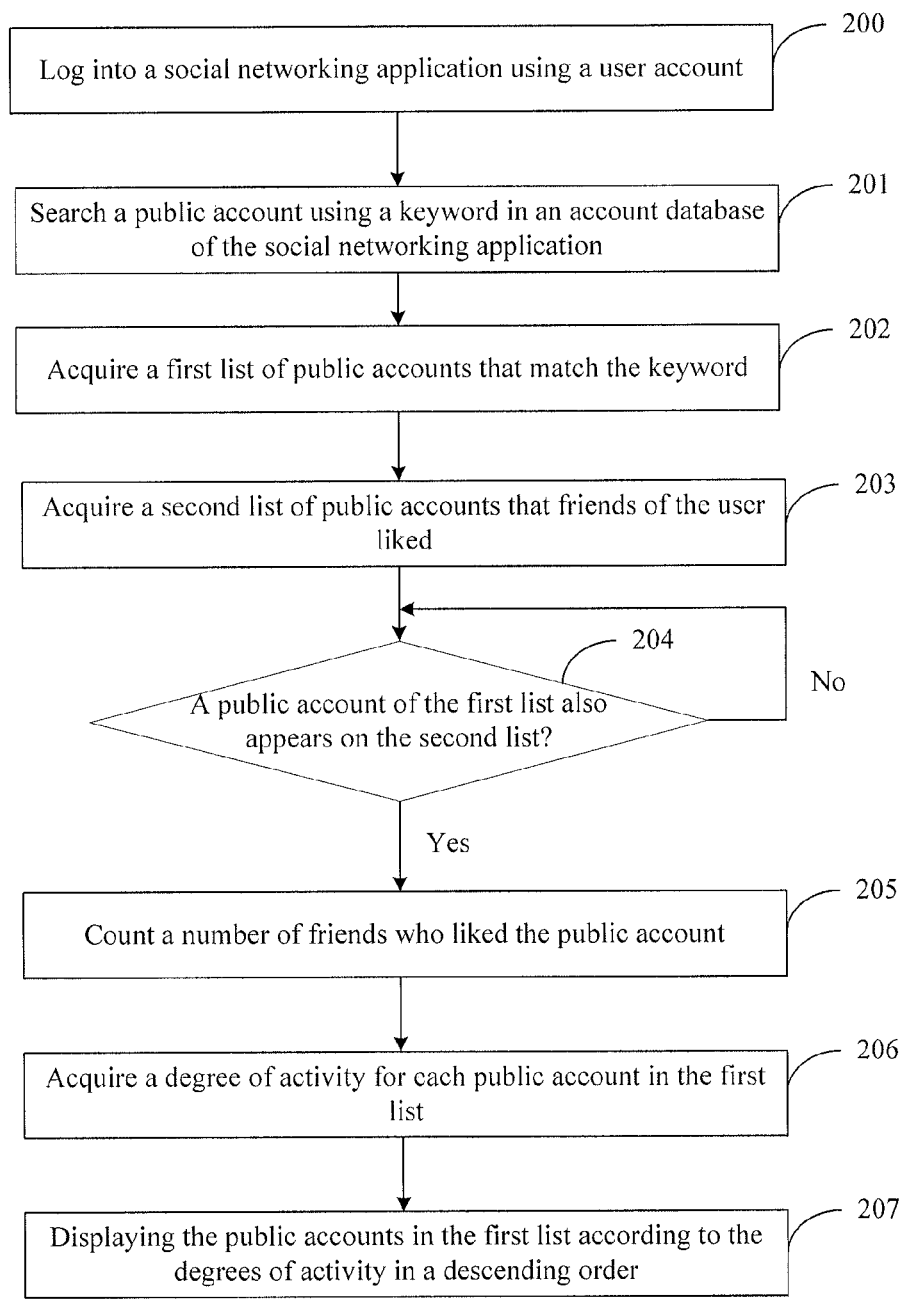
FIG. 2 is an exemplary method of searching a public account in a social networking application according to another embodiment of the present application.

FIG. 2 is an exemplary method of searching a public account in a social networking application according to another embodiment of the present application. As shown in FIG. 2, a method of searching a public account in a social networking application may include steps discussed below.

At step 200, a user logs in a social networking application using a user account.

At step 201, the user searches a public account using a keyword in an account database of the social networking application.

At step 202, the user acquires a first list of public accounts that match the keyword.

At step 203, the user acquires a second list of public accounts that friends of the user liked.

At step 204, the user compares the first list of public accounts with the second list of public accounts, and determines if a public account of the first list also appears on the second list.

At step 205, if a public account of the first list also appears on the second list, the user retrieves information of friends who liked the public account, and counts a number of friends who liked the public account.

At step 206, the user acquires a degree of activity for each public account in the first list.

At step 207, the public accounts in the first list are displayed according to the degrees of activity in a descending order.

In some embodiments, a backend server may obtain the keyword that the user inputs, and search a database associated with registered public accounts. If a public account matches the keyword or partially matches the keyword, the public account is added to the search result.

In some embodiments, the backend server may retrieve friends' information of the user, including names, icons or photos, brief descriptions, signatures, and the public accounts that the friends like or follow.

In some embodiments, a degree of activity for each public account in the first list may be acquired, and the public accounts in the first list may be displayed according to the degrees of activity in a descending order. If two public accounts have a same degree of activity, a public account with certification may be displayed prior to a public account with no certification; and if two public accounts have the same degree of activity and certifications respectively, the two public accounts may be displayed according to the number of friends who liked the two public accounts in a descending order.

The degree of activity of a public account may be defined as the frequency of publishing news or providing services by the certification unit or the owner of the account. For example, if a public subscription account owner releases ten publications per day, the degree of activity of this account may be defined as ten. In some embodiments, a public account with a high degree of activity releases publications or provides services more frequently, and thus, may better meet the user's requirements. Displaying the searched public accounts according to the degrees of activity in a descending order may decrease the time to select an interesting public account.

In some embodiments, a certified public account may represent a company or a government department that has genuine authority, and thus, a certified account may be more trustworthy to a user. Displaying a public account with certification prior to a public account with no certification when two public accounts have a same degree of activity may give the user a quick reference to choose from, and thus, decreasing the decision time.

According to the present application, search result of a public account may be displayed with a list of the public accounts that match the keyword, along with a brief description of each public account and numbers of friends that liked or followed the public account. The user may learn the popularity and influence of a public account based on the information displayed, and make a quick selection from the list of searched accounts. Instead of going through the list of searched accounts, the user may select from the top of the list, and quickly find the interesting public account.

Figure 3:
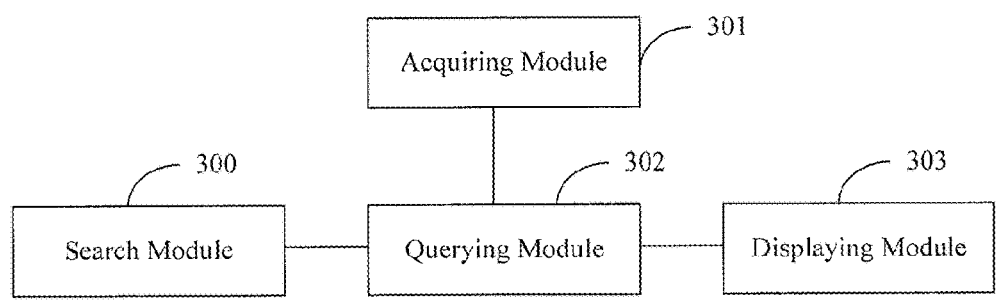
FIG. 3 is an exemplary diagram illustrating a system of searching a public account in a social networking application according to some embodiments of the present application.

FIG. 3 is an exemplary diagram illustrating a system of searching a public account in a social networking application according to some embodiments of the present application. As shown in FIG. 3, the system of searching a public account in a social networking application may comprise a search module 300 configured to search a public account using a keyword in an account database of the social networking application; an acquiring module 301 configured to acquire a first list of public accounts that match the keyword; a querying module 302 configured to acquire a second list of public accounts that friends of the user liked; and a displaying module 303 configured to display the public accounts in the first list with information of friends who liked the public accounts. The search module 300, the acquiring module 301, the querying module 302, and the displaying module 303 may be implemented in hardware, firmware, software or any combination thereof.

Figure 4:
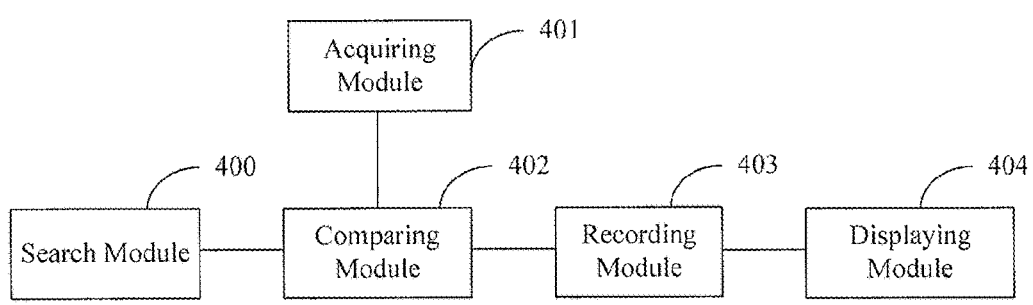
FIG. 4 is an exemplary diagram illustrating a system of searching a public account in a social networking application according to another embodiment of the present application.

FIG. 4 is an exemplary diagram illustrating a system of searching a public account in a social networking application according to another embodiment of the present application. As shown in FIG. 4, the system of searching a public account in a social networking application may comprise a search module 400 configured to search a public account using a keyword in an account database of the social networking application; an acquiring module 401 configured to acquire a first list of public accounts that match the keyword; a comparing module 402 configured to compare the first list of public accounts with the second list of public accounts, and determine if a public account of the first list also appears on the second list; a recording module 403 configured to retrieve information of friends who liked the public account if a public account of the first list also appears on the second list, and count a number of friends who liked the public account; and a displaying module 404 configured to display the public accounts in the first list with information of friends who liked the public accounts. The search module 400, the acquiring module 401, the comparing module 402, the recording module 403, and the displaying module 404 may be implemented in hardware, firmware, software or any combination thereof.

Figure 5:
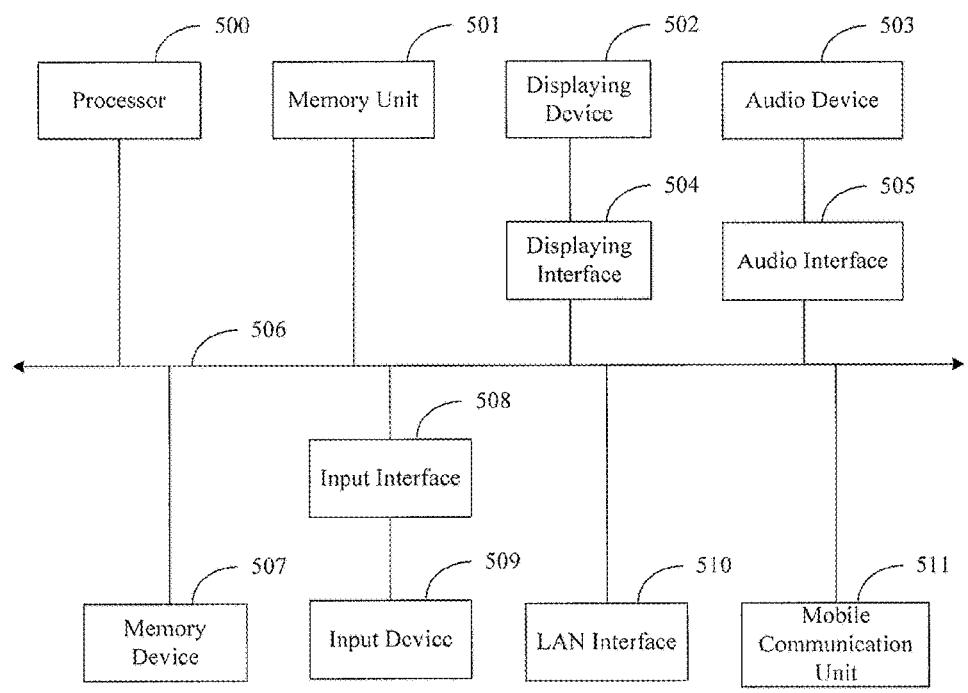
FIG. 5 is an exemplary computer diagram of a system of searching a public account in a social networking application according to some embodiments of the present application.

FIG. 5 is an exemplary computer diagram of a system of searching a public account in a social networking application according to some embodiments of the present application. The computer diagram of a system of searching a public account in a social networking application may include a processor 500, a memory unit 501, a displaying device 502, an audio device 503, a displaying interface 504, an audio interface 505, a system bus line 506, a memory device 507, an input interface 508, an input device 509, a LAN interface 510, and a mobile communication unit 511.

The system of searching a public account in a social networking application may be a desktop, a laptop, a personal digital assistant (PDA), a smart phone, a pad computer, or the like. The processor 500, memory unit 501, displaying device 502, audio device 503, displaying interface 504, audio interface 505, memory device 507, input interface 508, input device 509, LAN interface 510, and mobile communication unit 511 may be connected to the system bus line 506, respectively. The processor 500 may be a hardware configured to execute one or more programs using balgorithms and logical computing. The memory unit 501 may be a temporary or permanent physical device configured to store the one or more programs and data (e.g., the status information of the one or more programs), including read-only memory (ROM), flash memory, or random-access memory (RAM). The RAM may be generally the main memory unit loaded with the operation system and the applications. The system bus line 506 may be one of the following types: a memory bus line, an external bus line for the memory controller unit, or a local bus line. The processor 500 and the memory unit 501 may communicate with each via the system bus line 506. The displaying device 502 may be an LCD monitor, the audio device 503 may be a microphone, the displaying interface 504 may be a graphic processing unit, and the audio interface 505 may be a sound card. The displaying device 502 and the audio device 503 may be applied for the user to experience the multimedia contents. The memory device 507 may read from a plurality of non-transitory computer readable storage medium, including mobile storage medium and fixed storage medium. For example, the non-transitory computer readable storage medium may include a flash memory (for example, a mini SD card), CD-ROM, DVD, optical disc, cassette, magnetic disc, or other magnetic storage medium. The input interface 508 may be an IO controller. The input device 509 may be a keyboard, a mouse, a touchable screen, or the like. The input device 509 may be connected to the system bus line 506 via the input interface 508, but may be also connected to the system bus line 506 via other interfaces, for example, a USB interface. The system of searching a public account in a social networking application may communicate with other network devices via the LAN interface 510 or the mobile communication unit 511. In some embodiments, the system may include, for example, a Bluetooth unit that is configured to exchange data in over short distance range, an image sensor configured to capture pictures, or an accelerometer to measure acceleration. In some embodiments, the system may be implemented in any hardware, firmware, software or any combination thereof.

Although the terms first, second, or the like, may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the present application herein is for the purpose of describing particular embodiments only and is not intended to be a limitation of the scope. As used in the description of the present application and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method of subscribing to public accounts in a social networking application, comprising:
   at a computer associated with a user of the social networking application, the computer having one or more processors and memory storing programs executed by the one or more processors and in communication with a back-end server of the social networking application:
   logging in to the social networking application using a user account of the user;
   performing a keyword search for a public account in an account database of the social networking application, wherein the public account is an account of the social networking application that pushes information user accounts of the social networking application that have subscribed to the public account;
   acquiring a first list of public accounts that matches the keyword;
   acquiring a second list comprising public accounts that friends of the user on the social networking application liked, wherein each friend is a direct contact of the user on the social networking application;
   comparing the first list of public accounts with the second list of public accounts;
   for each public account of the first list that also appears on the second list:
      retrieving, from the back-end server, information of friends of the user who liked the public account, including a count of the friends and identification of the friends;
   displaying the first list in a descending order according to the count of friends who liked the public accounts, including displaying a profile for each public account in the first list with the corresponding information of the friends who liked the public account;
   receiving a user selection of an interested public account on the first list; and
   responsive to the user selection, sending information of the user selection to the backend server, thereby causing the user to be subscribed to the interested public account.

2. The method of claim 1, wherein the corresponding information of the friends include icons of the friends, names of the friends, and signatures of the friends.

3. The method of claim 1, further comprising:
   acquiring a degree of activity for each public account in the first list, and
   displaying the public accounts in the first list according to the degrees of activity in a descending order.

4. The method of claim 3, further comprising:
   if two public accounts have a same degree of activity, displaying a public account with certification prior to a public account with no certification; and
   if two public accounts have the same degree of activity and certifications respectively, displaying the two public accounts according to the number of friends who liked the two public accounts in a descending order.

5. A system of subscribing to public accounts in a social networking application, wherein the system is associated with a user of the social networking application, the system comprising,
   one or more processors in communication with a back-end server;
   memory; and
   one or more programs stored in the memory and configured for execution by the one or more processors, the one or more programs including instructions for:
      logging in to the social networking application using a user account of the user;
      performing a keyword search for a public account in an account database of the social networking application, wherein the public account is an account of the social networking application that pushes information user accounts of the social networking application that have subscribed to the public account;
      acquiring a first list of public accounts that matches the keyword;
      acquiring a second list comprising public accounts that friends of the user on the social networking application liked, wherein each friend is a direct contact of the user on the social networking application;
      comparing the first list of public accounts with the second list of public accounts;
      for each public account of the first list that also appears on the second list:
         retrieving, from the back-end server, information of friends of the user who liked the public account, including a count of the friends and identification of the friends;
      displaying the first list in a descending order according to the count of friends who liked the public accounts, including displaying a profile for each public account in the first list with the corresponding information of the friends who liked the public account;
      receiving a user selection of an interested public account on the first list; and
      responsive to the user selection, sending information of the user selection to the backend server, thereby causing the user to be subscribed to the interested public account.

6. The system of claim 5, wherein the corresponding information of the friends include icons of the friends, names of the friends, and signatures of the friends.

7. The system of claim 5, wherein the one or more programs further include instructions for:
   acquiring a degree of activity for each public account in the first list, and
   displaying the public accounts in the first list according to the degrees of activity in a descending order.

8. The system of claim 7, wherein the one or more programs further include instructions for:
   if two public accounts have a same degree of activity, displaying a public account with certification prior to a public account with no certification; and
   if two public accounts have the same degree of activity and certifications respectively, displaying the two public accounts according to the number of friends who liked the two public accounts in a descending order.

9. A non-transitory computer readable storage medium, storing one or more programs having instructions which, when executed by one or more processors of a service processing system, configures the one or more processors in communication with a back-end server for:
   logging in to a social networking application using a user account of the user;
   performing a keyword search for a public account in an account database of the social networking application, wherein the public account is an account of the social networking application that pushes information user accounts of the social networking application that have subscribed to the public account;
   acquiring a first list of public accounts that matches the keyword;

acquiring a second list comprising public accounts that friends of the user on the social networking application liked, wherein each friend is a direct contact of the user on the social networking application;

comparing the first list of public accounts with the second list of public accounts;

for each public account of the first list that also appears on the second list:

retrieving, from the back-end server, information of friends of the user who liked the public account, including a count of the friends and identification of the friends;

displaying the first list in a descending order according to the count of friends who liked the public accounts, including displaying a profile for each public account in the first list with the corresponding information of the friends who liked the public account;

receiving a user selection of an interested public account on the first list; and responsive to the user selection, sending information of the user selection to the backend server, thereby causing the user to be subscribed to the interested public account.

10. The non-transitory computer readable storage medium of claim 9, wherein the corresponding information of the friends include icons of the friends, names of the friends, and signatures of the friends.

11. The non-transitory computer readable storage medium of claim 9, wherein the one or more programs further include instructions for:

acquiring a degree of activity for each public account in the first list, and displaying the public accounts in the first list according to the degrees of activity in a descending order.

12. The non-transitory computer readable storage medium of claim 11, wherein the one or more programs further include instructions for:

if two public accounts have a same degree of activity, displaying a public account with certification prior to a public account with no certification; and if two public accounts have the same degree of activity and certifications respectively, displaying the two public accounts according to the number of friends who liked the two public accounts in a descending order.

\* \* \* \* \*